(12) United States Patent
Wei

(10) Patent No.: US 10,349,043 B2
(45) Date of Patent: Jul. 9, 2019

(54) THREE-DIMENSIONAL DISPLAY DEVICE

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 111 days.

(21) Appl. No.: 15/522,757

(22) PCT Filed: Jul. 11, 2016

(86) PCT No.: PCT/CN2016/089599
§ 371 (c)(1),
(2) Date: Apr. 27, 2017

(87) PCT Pub. No.: WO2017/156937
PCT Pub. Date: Sep. 21, 2017

(65) Prior Publication Data
US 2018/0091801 A1   Mar. 29, 2018

(30) Foreign Application Priority Data
Mar. 17, 2016  (CN) .......................... 2016 1 0154134

(51) Int. Cl.
*H04N 13/31* (2018.01)
*G02B 27/22* (2018.01)
*H04N 13/317* (2018.01)

(52) U.S. Cl.
CPC ............ *H04N 13/31* (2018.05); *G02B 27/22* (2013.01); *G02B 27/2214* (2013.01); *H04N 13/317* (2018.05)

(58) Field of Classification Search
CPC ...... H04N 13/31; H04N 13/317; G02B 27/22; G02B 27/2214
See application file for complete search history.

(56) References Cited

U.S. PATENT DOCUMENTS 9,664,913 B2 *  5/2017  Niu ..................... G02B 27/2214
9,762,894 B2 *  9/2017  Wei ........................ H04N 13/31
(Continued)

FOREIGN PATENT DOCUMENTS

CN    202453582 U    9/2012
CN    202720395 U    2/2013
(Continued)

OTHER PUBLICATIONS

First Chinese Office Action, for Chinese Patent Application No. 201610154134.8, dated Mar. 3, 2017, 9 pages.
(Continued)

*Primary Examiner* — Dave Czekaj
*Assistant Examiner* — Shanika M Brumfield
(74) *Attorney, Agent, or Firm* — Kinney & Lange, P.A.

(57) ABSTRACT

A three-dimensional display device is disclosed. The three-dimensional display device includes a two-dimensional display panel and a slit grating; the two-dimensional display panel includes a plurality of first display units for displaying a left eye image and a plurality of second display units for displaying a right eye image, and the first and second display units are alternately arranged in a row direction and a column direction of the two-dimensional display panel; the slit grating includes a plurality of grating units arranged in a form of an array, a slit is formed between every adjacent grating units in each row of grating units arranged in the row direction of the two-dimensional display panel, slits and grating units are alternately arranged in the column direction of the two-dimensional display panel.

12 Claims, 10 Drawing Sheets

(56) References Cited

U.S. PATENT DOCUMENTS

| | | | |
|---|---|---|---|
| 2009/0278936 A1* | 11/2009 | Pastoor | G09G 3/003 348/169 |
| 2013/0321246 A1* | 12/2013 | Li | G09G 3/003 345/31 |
| 2015/0109549 A1* | 4/2015 | Gong | G02B 27/2214 349/15 |
| 2015/0160463 A1* | 6/2015 | Niu | G02B 27/2214 349/15 |
| 2015/0195513 A1* | 7/2015 | Li | G02B 27/2214 348/55 |
| 2017/0212358 A1* | 7/2017 | Fan | H04N 13/31 |

FOREIGN PATENT DOCUMENTS

| | | |
|---|---|---|
| CN | 104597611 A | 5/2015 |
| CN | 104849870 A | 8/2015 |
| CN | 105549214 A | 5/2016 |
| KR | 20060032547 A | 4/2006 |

OTHER PUBLICATIONS

International Search Report and Written Opinion (including English translation of Box V) for PCT Patent Application No. PCT/CN2016/089599, dated Nov. 25, 2016, 15 pages.

* cited by examiner

THREE-DIMENSIONAL DISPLAY DEVICE

CROSS REFERENCE TO RELATED APPLICATIONS

This application is a Section 371 National Stage Application of International Application No. PCT/CN2016/089599, filed on 11 Jul. 2016, entitled "THREE-DIMENSION DISPLAY DEVICE", which claims priority to Chinese Application No. 2016101544034.8, filed on 17 Mar. 2016, incorporated herein by reference in its entirety.

TECHNICAL FIELD

The present disclosure relates to the field of display technology, and especially to a three-dimensional display device.

BACKGROUND

For a naked eye three-dimensional (hereinafter, 3D for short) display device, a user does not need to wear glasses, a helmet or other visual aid devices to watch 3D images or video. In the naked eye 3D display device, grating type 3D display devices draw attentions due to simple structure, low cost, good performance and other advantages. Grating type 3D display devices may be classified into slit grating 3D display devices and cylindrical lens grating 3D display devices based on different types of gratings that are utilized.

The slit grating 3D display device alternately displays a left eye image and a right eye image (images of a same object captured from two different viewing angles) with pixels of a display panel along a row direction of the display panel, and a slit grating is provided at a side of the display panel in parallel with the display panel. The slit grating includes a plurality of grating sheets spaced apart from each other along the row direction of the display panel, and a slit formed between two adjacent grating sheets extends in a column direction of the display panel. With a shielding function of the grating sheets, the left eye image and the right eye image may be seen by a left eye and a right eye respectively through the slits, the left eye image and the right eye image form an image pair having a horizontal parallax, and through image fusion performed by the user's brain, a stereo image having a depth of focus or depth perception is formed finally.

During development of the present disclosure, the inventor found that prior arts have at least the following problems.

A display panel is provided with a black matrix, and pixels arranged in an array are disposed within the black matrix, since spatial frequencies of the black matrix and the slit grating are close, moiré fringes will be generated after light emitted by the pixels has passed through the slit grating, which may badly affect visual effect when viewed by a watcher.

FIG. 1 illustratively shows a principle of moiré fringes being generated in a 3D display device according to prior arts. Pixels arranged in an array are disposed within a black matrix 200, and a slit grating 300 includes a plurality of grating sheets spaced apart from each other, since spatial frequencies of the black matrix 200 and the slit grating 300 are close, Moiré fringes 400 will be generated after light emitted by the pixels has passed through the slit grating 300, which may badly affect visual effect when viewed by a watcher.

SUMMARY

A three-dimensional display device is provided in embodiments of the present disclosure to solve at least a part of technical problems in prior arts.

According to an exemplary embodiment, a three-dimensional display device includes a two-dimensional display panel and a slit grating disposed at a side of the two-dimensional display panel;

the two-dimensional display panel includes a plurality of first display units configured for displaying a left eye image and a plurality of second display units configured for displaying a right eye image, and the first display units and the second display units are alternately arranged in a row direction and a column direction of the two-dimensional display panel; and the slit grating includes a plurality of grating units arranged in a form of an array, a slit is formed between every two adjacent grating units in each row of grating units arranged in the row direction of the two-dimensional display panel, the slits and the grating units are alternately arranged in the column direction of the two-dimensional display panel, and the slit grating is configured to display the left eye image and the right eye image to observer's left eye and right eye respectively.

According to a further embodiment, in any two adjacent rows of grating units, a central line of a most intermediate slit in one row of grating units is located in the same straight line as a central line of a most intermediate grating unit of the other row of grating units.

According to a further embodiment, the two-dimensional display panel further includes a black matrix configured to space the first display units and the second display units apart, and a central line of the black matrix extending in the column direction of the two-dimensional display panel is located in the same straight line as the central line of the most intermediate slit in the one row of grating units of the any two adjacent rows of grating units.

Exemplarily, each first display unit includes one or more pixels, each second display unit includes one or more pixels, and the first display unit and the second display unit arranged in a same row in the row direction of the two-dimensional display panel include a same number of pixels.

According to a further embodiment, each pixel includes sub-pixels of three different colors arranged in the column direction of the two-dimensional display panel, and a size of each sub-pixel in the column direction of the two-dimensional display panel is smaller than a size of the sub-pixel in the row direction of the two-dimensional display panel.

According to a further embodiment, a ratio between the size of the sub-pixel in the column direction of the two-dimensional display panel and the size of the sub-pixel in the row direction of the two-dimensional display panel is 1:3.

According to a further embodiment, an inclined angle θ of an equivalent inclined slit of an array formed by slits in two adjacent rows of grating units satisfies one of the following conditions:

$$15.9° < \theta < 62.5°, \text{ and}$$

$$73.7° < \theta < 82.9°,$$

where the inclined angle θ is defined as follows: in a rectangle having a long side equal to a sum of lengths of two adjacent rows of grating units in the column direction of the two-dimensional display panel and a short side equal to a sum of a distance between two adjacent grating units in the same row of grating units and the width of one grating unit, an included angle between a diagonal line of the rectangle and a straight line extending in the row direction of the two-dimensional display panel is defined as the inclined angle θ.

According to a further embodiment, within any two adjacent rows of display units, each of the first display unit and the second display unit in one row of the two adjacent rows includes five pixels arranged in the column direction of the two-dimensional display panel, while each of the first display unit and the second display unit in the other row of the two adjacent rows includes four pixels arranged in the column direction of the two-dimensional display panel.

According to a further embodiment, in each row of display units, each of the first display unit and the second display unit includes five pixels arranged in the column direction of the two-dimensional display panel.

According to a further embodiment, wherein in each row of display units, each of the first display unit and the second display unit includes four pixels arranged in the column direction of the two-dimensional display panel.

According to a further embodiment, the slit grating is disposed at a light exit side of the two-dimensional display panel, and a distance h between the slit grating and the two-dimensional display panel satisfies the following equation:

$$h=a*s/L,$$

where A is a size of the sub-pixel in the row direction of the two-dimensional display panel, s is a distance between the slit grating and an observation point of an observer's eye, and L is a distance between two eyes of the observer.

According to a further embodiment, a pitch B between two adjacent grating units in the same row of grating units satisfies the following equation:

$$B=2*A*s/(s+h),$$

where A is the size of the sub-pixel in the row direction of the two-dimensional display panel, s is the distance between the slit grating and the observation point of the observer's eye, and h is the distance between the slit grating and the two-dimensional display panel.

According to a further embodiment, the slit grating is disposed at a light incoming side of the two-dimensional display panel, and a distance h between the slit grating and the two-dimensional display panel satisfies the following equation:

$$h=A*s/L-s,$$

where A is a size of the sub-pixel in the row direction of the two-dimensional display panel, s is a distance between the slit grating and an observation point of an observer's eye, and L is a distance between two eyes of the observer.

According to a further embodiment, a pitch B between two adjacent grating units in the same row of grating units satisfies the following equation:

$$B=2*A*s/(s-h),$$

where A is the size of the sub-pixel in the row direction of the two-dimensional display panel, s is the distance between the slit grating and the observation point of the observer's eye, and h is the distance between the slit grating and the two-dimensional display panel.

Beneficial effect provided by embodiments of the disclosure includes:
a slit is formed between two adjacent grating units in every row of the grating units arranged in the row direction of the two-dimensional display panel, and the slits and the grating units are arranged alternately in the column direction of the two-dimensional display panel; moiré fringes generated due to spatial frequencies of the black matrix and the slit grating being close will be spaced apart in the column direction of the two-dimensional display panel, and a size of the moiré fringes that are spaced apart is less than a size that can be recognized by a human being's eye, thus, influence caused by the moiré fringes will be reduced.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS

Figure 1:
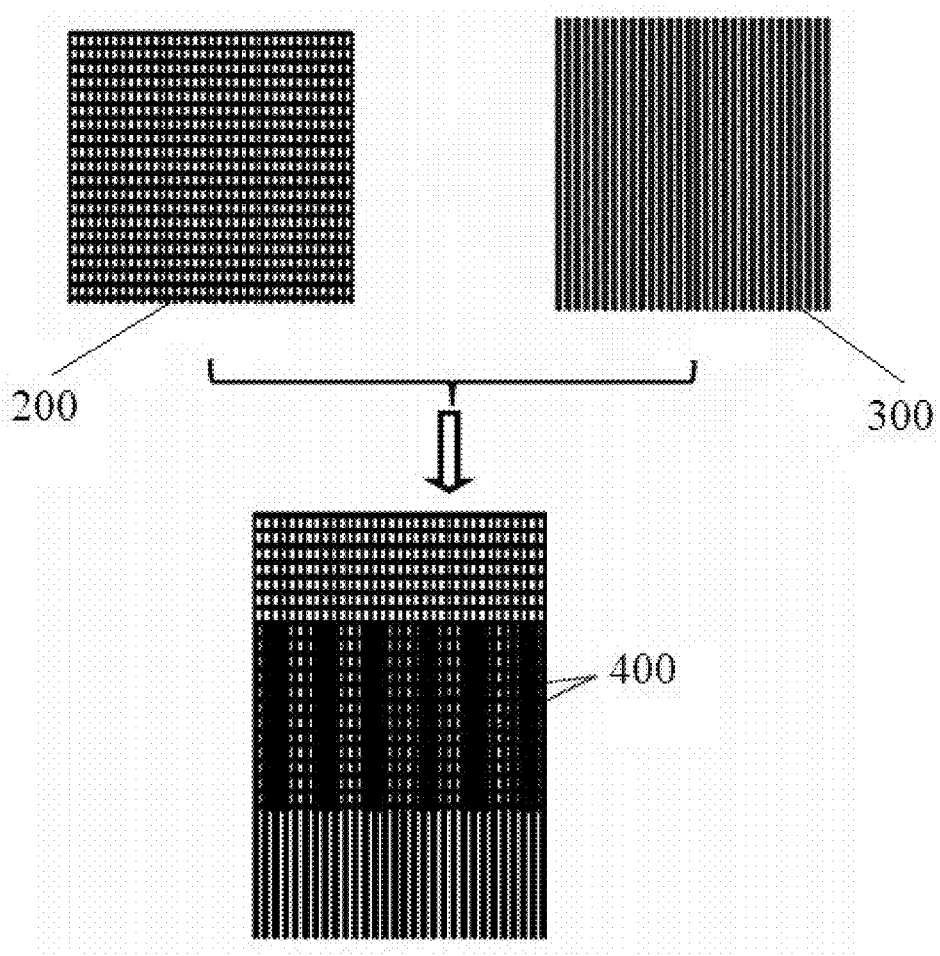
FIG. 1 is a schematic drawing showing a structure according to an embodiment of the disclosure, by which Moiré fringes are generated.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the concept of the present disclosure will be understood thoroughly and completely by those skilled in the art.

Figure 2:
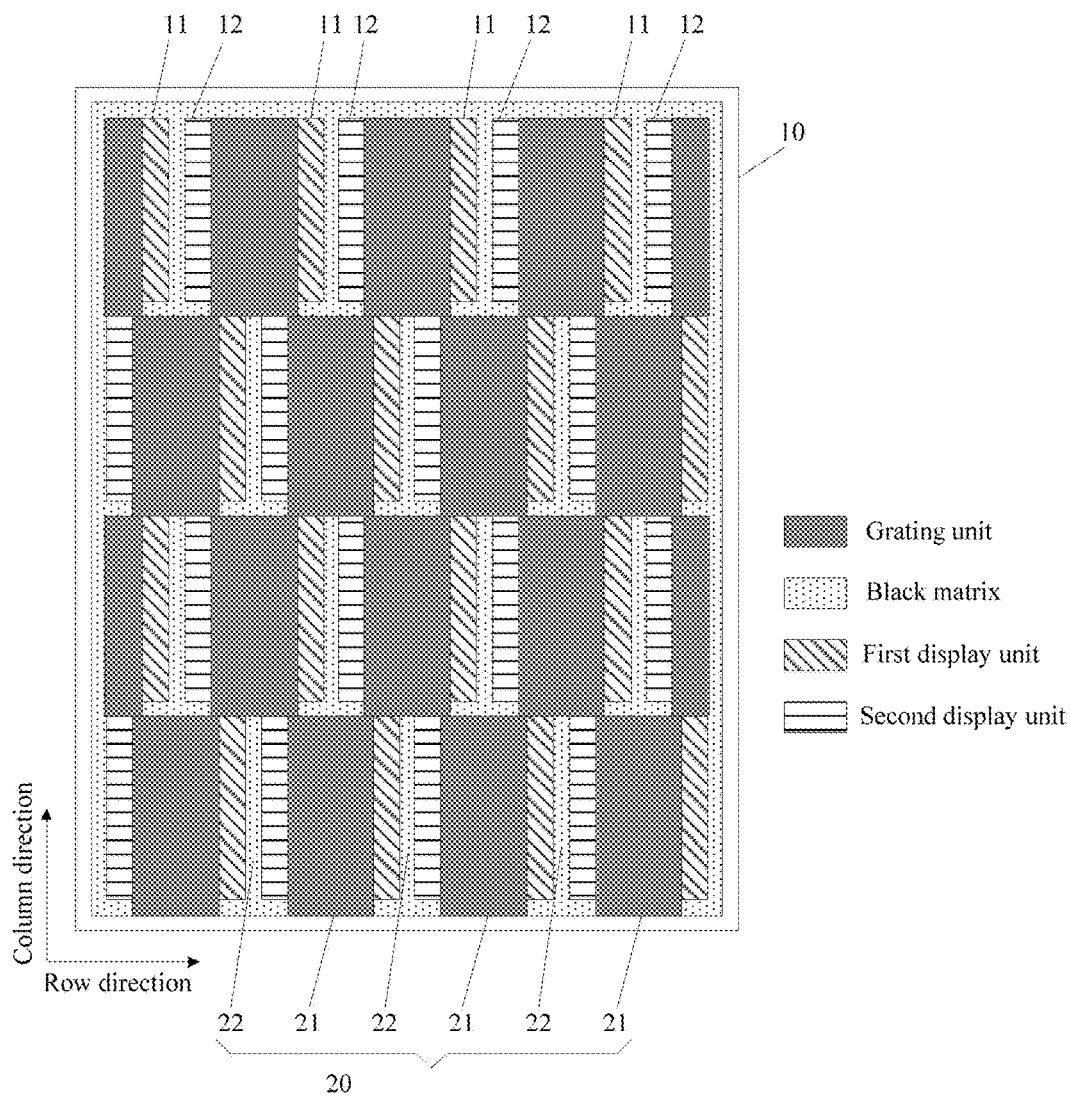
FIG. 2 is a schematic drawing showing a structure of a three-dimensional display device according to an embodiment of the disclosure.

According to an embodiment of the disclosure, a three-dimensional display device is provided, as shown in FIG. 2. The three-dimensional display device includes a two-dimensional display panel 10 and a slit grating 20 disposed at a side of the two-dimensional display panel 10.

The two-dimensional display panel 10 includes a plurality of first display units 11 for displaying a left eye image and a plurality of second display units 12 for displaying a right eye image, the first display units 11 and the second display units 12 are alternately arranged in a row direction and a column direction of the two-dimensional display panel 10. In an exemplary embodiment, the row direction is perpendicular to the column direction.

The slit grating 20 includes a plurality of grating units 21 arranged in a form of an array, a slit 22 is formed between every two adjacent grating units 21 in each row of grating units 21 arranged in the row direction of the two-dimensional display panel 10, the slits 22 and the grating units 21 are alternately arranged in the column direction of the two-dimensional display panel 10, and the slit grating 20 is configured to display the left eye image and the right eye image to an observer's left eye and right eye respectively.

In the embodiment of the disclosure, a slit is formed between every two adjacent grating units in each row of the grating units arranged in the row direction of the two-dimensional display panel, and the slits and the grating units are arranged alternately in the column direction of the two-dimensional display panel. Moiré fringes generated due to spatial frequencies of the black matrix and the slit grating being close will be spaced apart in the column direction of the two-dimensional display panel, and a size of the moiré fringes that are spaced apart is less than a size that can be recognized by a human being's eye, so that, influence caused by the moiré fringes will be reduced.

Figure 3A:
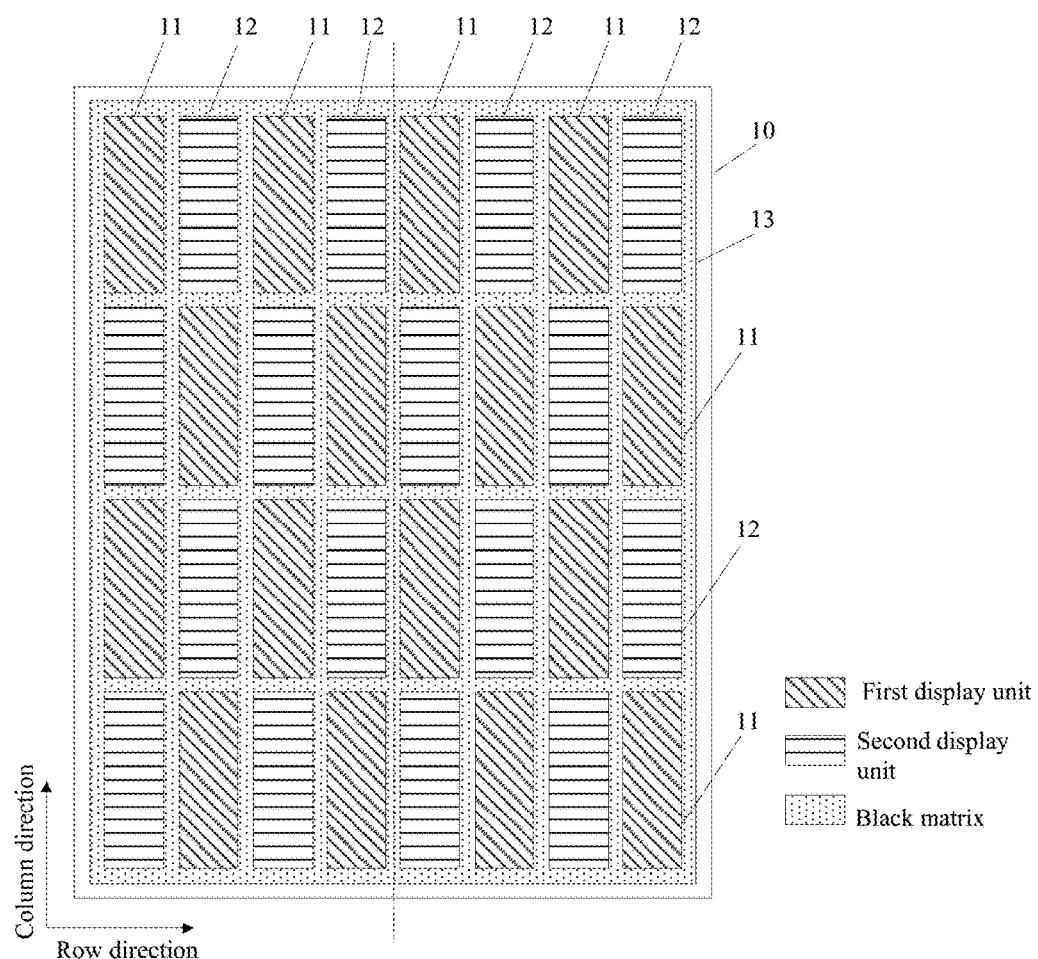
FIGS. 3a and 3b are schematic drawings showing structures of a two-dimensional display panel and a slit grating of the three-dimensional display device of FIG. 2, respectively.
Figure 3B:
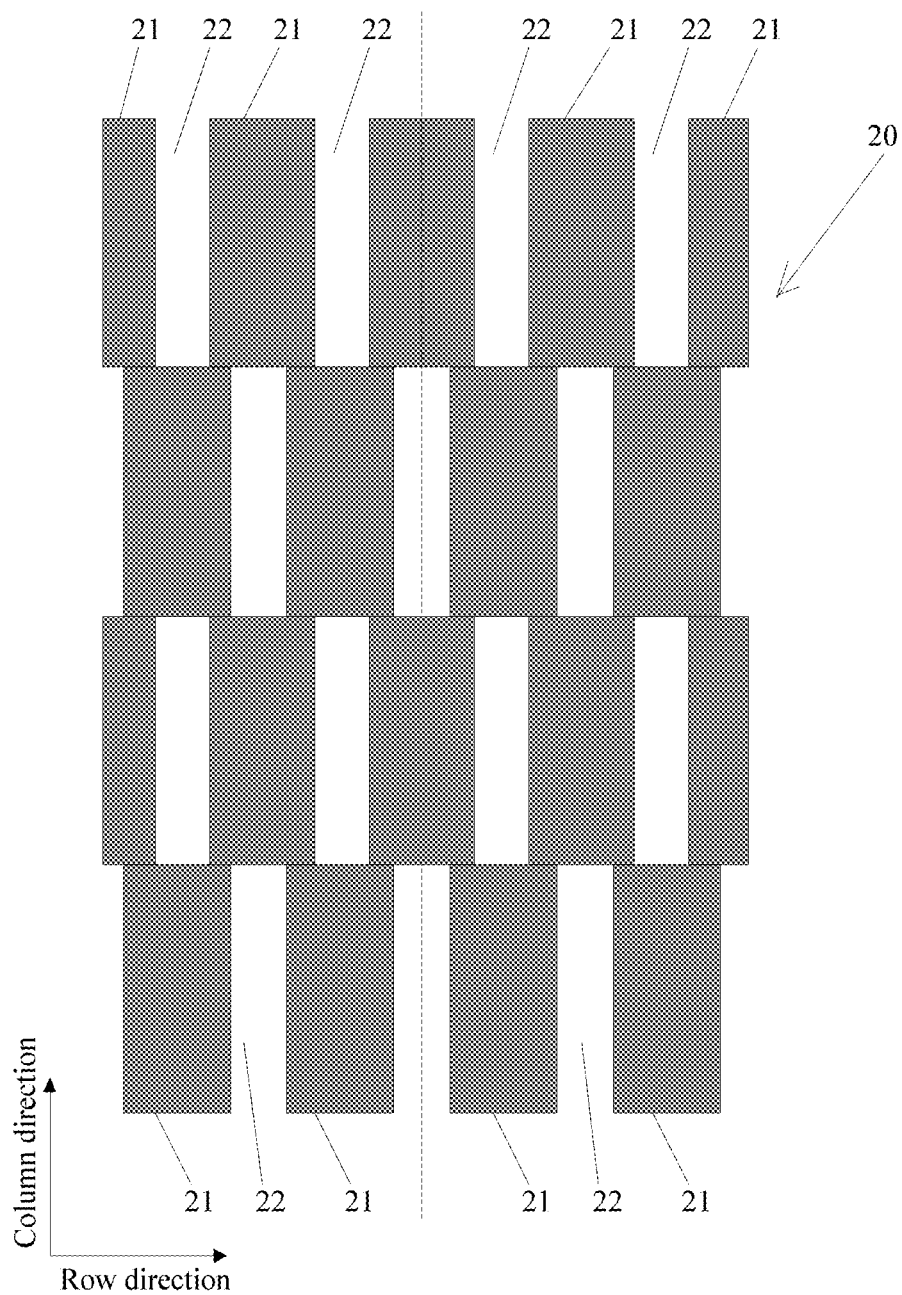

In the above embodiment, the two-dimensional display panel 10 is shown in FIG. 3a, and the slit grating 20 disposed at a side of the two-dimensional display panel 10 is shown in FIG. 3b.

As shown in FIG. 3a, the two-dimensional display panel 10 includes the plurality of first display units 11 configured to display a left eye image and the plurality of second display units 12 configured to display a right eye image, and the first display units 11 and the second display units 12 are arranged in the row direction and the column direction of the two-dimensional display panel 10 alternately.

As shown in FIG. 3b, the slit grating 20 includes the plurality of grating units 21 arranged in a form of an array, a slit 22 is formed between every two adjacent grating units 21 in each row of the grating units 21 arranged in the row direction of the two-dimensional display panel 10, the slits 22 and the grating units 21 are alternately arranged in the column direction of the two-dimensional display panel 10, and the slit grating 20 is configured to display the left eye image and the right eye image to a human's left eye and right eye respectively.

In this embodiment of the disclosure, the slits and the grating units are arranged alternately in the column direction of the two-dimensional display panel, so that moiré fringes generated due to spatial frequencies of the black matrix and the slit grating being close will be spaced apart in the column direction of the two-dimensional display panel, and a size of the moiré fringes that are spaced apart is less than a size that can be recognized by a human being's eye, so that, influence caused by the moiré fringes will be reduced. Moreover, the slit grating is still disposed vertically, the left eye image and the right eye image displayed are ensured to be at different sides of the slits respectively, and the left eye image and the right eye image are projected into a human's left eye and right eye through corresponding slits respectively. Therefore, there is not a problem of crosstalk between pixels caused by disposing the slit grating slantwise such that a portion of the left eye images are projected into the right eye and a portion of the right eye images are projected into the left eye.

In an exemplary embodiment, as shown in FIG. 3b, in any two adjacent rows of grating units 21, a central line (indicated by a dash line) of the most intermediate slit 22 in one row of grating units 21 is located in the same straight line as a central line (indicated by the dash line) of the most intermediate grating unit 21 of the other row of grating units 21.

It can be understood that, when the most intermediate grating unit of the slit grating and the most intermediate slit are aligned with each other and a watcher's eyes are aligned with a most intermediate region of a three-dimensional display device, viewing effect would be the best and this also complies with a customary practice of watching by eyes.

In an exemplary embodiment, as shown in FIG. 3a, the two-dimensional display panel 10 further includes a black matrix 13 configured to space the first display units 11 and the second display units 12 apart, and a central line (indicated by a dash line in FIG. 3a) of the black matrix 13 extending in the column direction of the two-dimensional display panel may be located in the same straight line with the central line (FIG. 3b) of the most intermediate slit 22 in the row of grating units 21 of the any two adjacent rows of grating units 21.

When implemented, the black matrix 13 may include a plurality of black stripes extending in the row direction of the two-dimensional display panel 10 and a plurality of black stripes extending in the column direction of the two-dimensional display panel 10. The plurality of black stripes extending in the row direction of the two-dimensional display panel 10 and the plurality of black stripes extending in the column direction of the two-dimensional display panel 10 are arranged crossing each other and in a form of network having a matrix arrangement. The network is provided therein with sub-pixels forming the first display units 11 and sub-pixels forming the second display units 12. A detailed description of the sub-pixels will be set forth hereinafter in conjunction with FIGS. 4a to 4d. In FIG. 3a, the black stripes disposed between alternately disposed first display units 11 and second display units 12 separate the first display units 11 from the second display units 12. The central line of the black matrix 13 extending in the column direction of the two-dimensional display panel refers to the central line of the most intermediate black stripe among the black strips extending in the column direction of the two-dimensional display panel 10.

It can be understood that, when the most intermediate portion of the black matrix is aligned with the most intermediate slit and the watcher's eyes are aligned with the most intermediate or central region of the three-dimensional display device, viewing effect would be attained to the best, because the left eye image projected through the most intermediate slit may just properly and entirely enter into the watcher's left eye and the right eye image projected through the most intermediate slit may just properly and entirely enter into the watcher's right eye due to the isolation function of the black matrix.

In practice, the left eye images and the right eye images projected through all the slits are insulated by a portion of the black matrix located therebetween. When the watcher's eyes are aligned with the most intermediate region of the three-dimensional display device, and if a central line of a non-intermediate portion of the black matrix is located in the same line with a central line of a corresponding slit, a portion of the left eye image will be projected into the watcher's right eye, or a portion of the right eye image will be projected into the watcher's left eye, such that crosstalk between pixels occurs. Therefore, in the case of a sum of a width of one grating unit and a width of one slit being kept constant, the width of the grating unit and the width of the slit may be adjusted accordingly (for example, the width of the grating unit is increased and the width of the slit is decreased, or the width of the grating unit is decreased and the width of the slit is increased), such that sight line of the watcher may just pass through the slit and arrive at the portion of the black matrix when the watcher's eyes are aligned with the most intermediate region of the three-dimensional display device, in which situation. In other words, a middle point between two eyes of the watcher, the central line of the slit and the central line of the corresponding portion of the black matrix are located in a same plane.

Specifically, as shown in FIGS. 4a to 4d, each first display unit 11 may include one or more pixels 100, each second display unit 12 may include one or more pixels 100, and the first display unit 11 and second display unit 12 arranged in the row direction and located in a same row of the two-dimensional display panel 10 include the same number of pixels 100.

It can be understood that, to satisfy requirements of displays of different sizes, the number of pixels included in the first display unit or the second display unit is not specifically defined. Within the same row, the number of pixels included in the first display unit is the same as the number of the pixels included in the second display unit, such that the left eye image displayed by the first display unit and the right eye image displayed by the second display unit are symmetrical with each other when projected through the same slit, and the best viewing effect can be attained.

According to an exemplary embodiment, as shown in FIGS. 4a to 4d, each pixel 100 includes sub-pixels 100a of three different colors arranged along the column direction of the two-dimensional display panel, a size of each sub-pixel 100a in the column direction of the two-dimensional display panel 10 may be smaller than a size thereof in the row direction of the two-dimensional display panel 10.

Specifically, the sub-pixel 100a is generally in the shape of a rectangle, long sides of the rectangle extend in the row direction of the two-dimensional display panel 10, and short sides of the rectangle extend in the column direction of the two-dimensional display panel 10.

Figure 5:
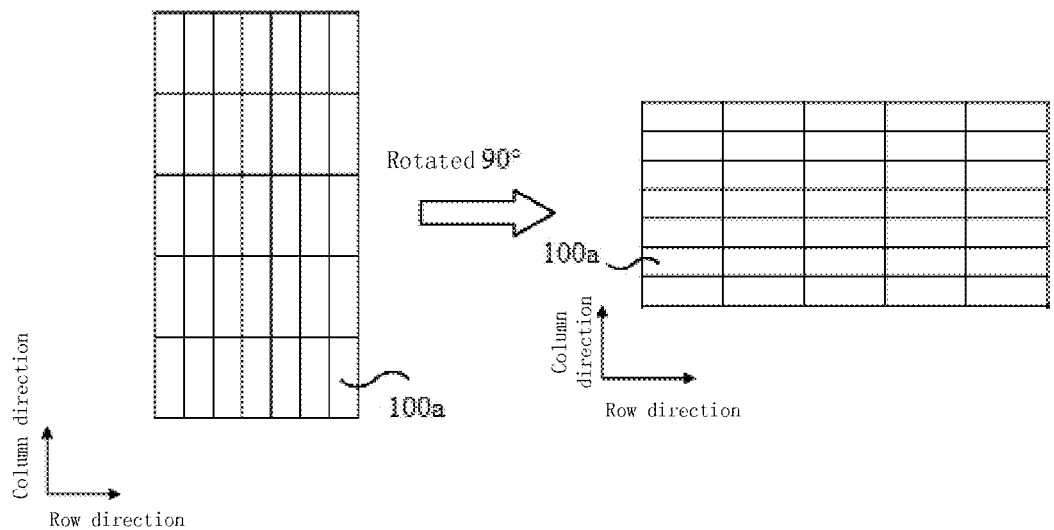
FIG. 5 is a schematic structural drawing showing situations in which a display device having a vertical screen according to an embodiment of the disclosure is used longitudinally and transversally respectively.

In practice, the three-dimensional display device is usually used in a mobile phone, a tablet computer or other display devices having a vertical screen, as shown by the left drawing of FIG. 5. When viewing a video (or picture or the like), to match the sizes of the video with the sizes of the display device, the vertical screen may be rotated by 90 degrees for displaying the video, as shown by the right drawing of FIG. 5, so as to avoid a distortion of picture and improve display effect.

With respect to a two-dimensional display panel of this type, the size of the sub-pixel 100a in the column direction of the two-dimensional display panel 10 may be smaller than the size thereof in the row direction of the two-dimensional display panel 10.

In an exemplary embodiment, a ratio between the size of the sub-pixel 100a in the column direction of the two-dimensional display panel 10 and the size thereof in the row direction of the two-dimensional display panel 10 may be 1:3, so as to achieve a better display effect.

Figure 6:
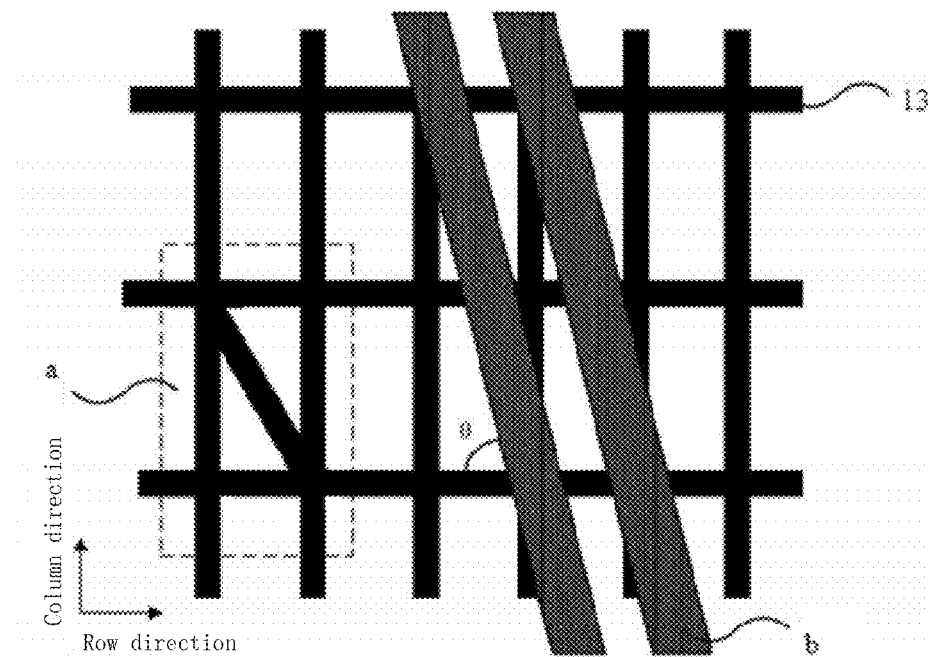
FIG. 6 is a schematic structural drawing showing a condition of Moiré fringes generated according to an embodiment of the disclosure.

Moiré fringes are alternate light and dark stripes generated due to oscillation frequency of light passing through the black matrix and oscillation frequency of light passing through the grating unit being close and interfering with each other. As shown in FIG. 6, the black matrix 13 having longitudinal portions and transverse portions crossing each other may in a microcosmical state present a plurality of rectangular frames a arranged in a form of an array, and the rectangular frames a of the black matrix 13 may have dark states along three directions, i.e., the transverse direction, the longitudinal direction and the diagonal direction, if they are viewed macroscopically.

At the same time, the slits 22 and the grating units 21 are arranged alternately in the column direction of the two-dimensional display panel 10, and the staggered slits 22 may substantially form several parallel and inclined lines when they are viewed as a whole. Therefore, in FIG. 6, the inclined lines b are equivalent to the staggered slits 22, and the following calculations are performed.

Firstly, in order to eliminate moiré fringes generated between the inclined line b and the dark state of the black matrix 13 in the diagonal direction, an included angle θ between the inclined line b and the transverse direction (which may also be named as an inclined angle) needs to satisfy the following Equation (1):

$$|71.56° - \theta_n| > \arccos \frac{P^2 * \left[ n^2 * \left( \frac{A}{3} * \sin 71.56° \right)^2 + B^2 \right] - \left( \frac{A}{3} * \sin 71.56° \right)^2 * B^2}{2 * n * \left( \frac{A}{3} * \sin 71.56° \right) * B * P^2}, \quad (1)$$

where P is a width of a minimum moiré fringe that can be seen by human's eyes, A is a width of one pixel, B is a pitch of the grating unit, n is a positive integer. Values of n (n=1, 2, 3, . . . , 100) are substituted into Equation (1) one by one to calculate ranges of $\theta_1$, $°_2$, $\theta_3$, . . . , and $\theta_{100}$, then an intersection of these ranges is used as a range of the included angle θ.

Then, in order to eliminate moiré fringes generated between the inclined line b and the dark state of the black matrix 13 in the transverse direction, the included angle θ between the inclined line b and the transverse direction needs to satisfy the following Equation (2):

$$\theta_n > \arccos \frac{P^2 * (n^2 * A^2 + B^2) - A^2 * B^2}{2 * n * A * B * P^2}, \quad (2)$$

where P is the width of the minimum moiré fringe that can be seen by human's eyes, A is the width of one pixel, B is the pitch of the grating unit, n is a positive integer. Values of n (n=1, 2, 3, . . . , 100) are substituted into Equation (1) one by one to calculate ranges of $\theta_1$, $\theta_2$, $\theta_3$, . . . , and $\theta_{100}$, then an intersection of these ranges is used as a range of the included angle θ.

Finally, in order to eliminate moiré fringes generated between the inclined line b and the dark state of the black matrix 13 in the longitudinal direction, the included angle θ between the inclined line b and the longitudinal direction needs to satisfy the following Equation (3):

$$\theta_n < 90° - \arccos \frac{P^2 * (n^2 * A^2/9 + B^2) - A^2 * B^2/9}{2 * n * A * B * P^2/3}, \quad (3)$$

where P is the width of the minimum moiré fringe that can be seen by human's eyes, A is the width of one pixel, B is the pitch of the grating unit, n is a positive integer. Values of n (n=1, 2, 3, . . . , 100) are substituted into Equation (1) one by one to calculate ranges of $\theta_1$, $\theta_2$, $\theta_3, \ldots,$ and $\theta_{100}$, then an intersection of these ranges is used as a range of the included angle $\theta$.

Equations (1)-(3) are known to the ordinary skilled in the art, and their deductions and principles are omitted herein.

Taking a popular three-dimensional display device having a 4.7 inches display screen for example, the width of one pixel A=0.05418 mm, the width of the minimum moiré fringe that can be seen by human's eyes P=0.291 mm, the pitch of the grating unit B=0.103 mm, these parameters are substituted into Equations (1)-(3), and it can be determined that the inclined angle $\theta$ of the slit between two adjacent grating units satisfies the following relations (4):

$$15.9° < \theta < 62.5°, \text{ or } 73.7° < \theta < 82.9° \qquad (4).$$

It has been proved by experiments that, when the inclined angle $\theta$ of the slit between two adjacent grating units satisfies the above relations, influence of moiré fringes generated due to the spatial frequency of the slit grating being close to the spatial frequency of the black matrix may be eliminated well.

In the above Equations (1)-(3), the included angle $\theta$ is defined as follows: in a rectangle c having a long side equal to a sum of lengths of two adjacent rows of grating units 21 in the column direction of the two-dimensional display panel 10 and a short side equal to a sum of a distance between two adjacent grating units 21 in the same row and the width of one grating unit 21, an included angle between a diagonal line d of the rectangle and a straight line b extending in the row direction of the two-dimensional display panel is defined as $\theta$, as shown in FIGS. 4a-4d.

Figure 4A:
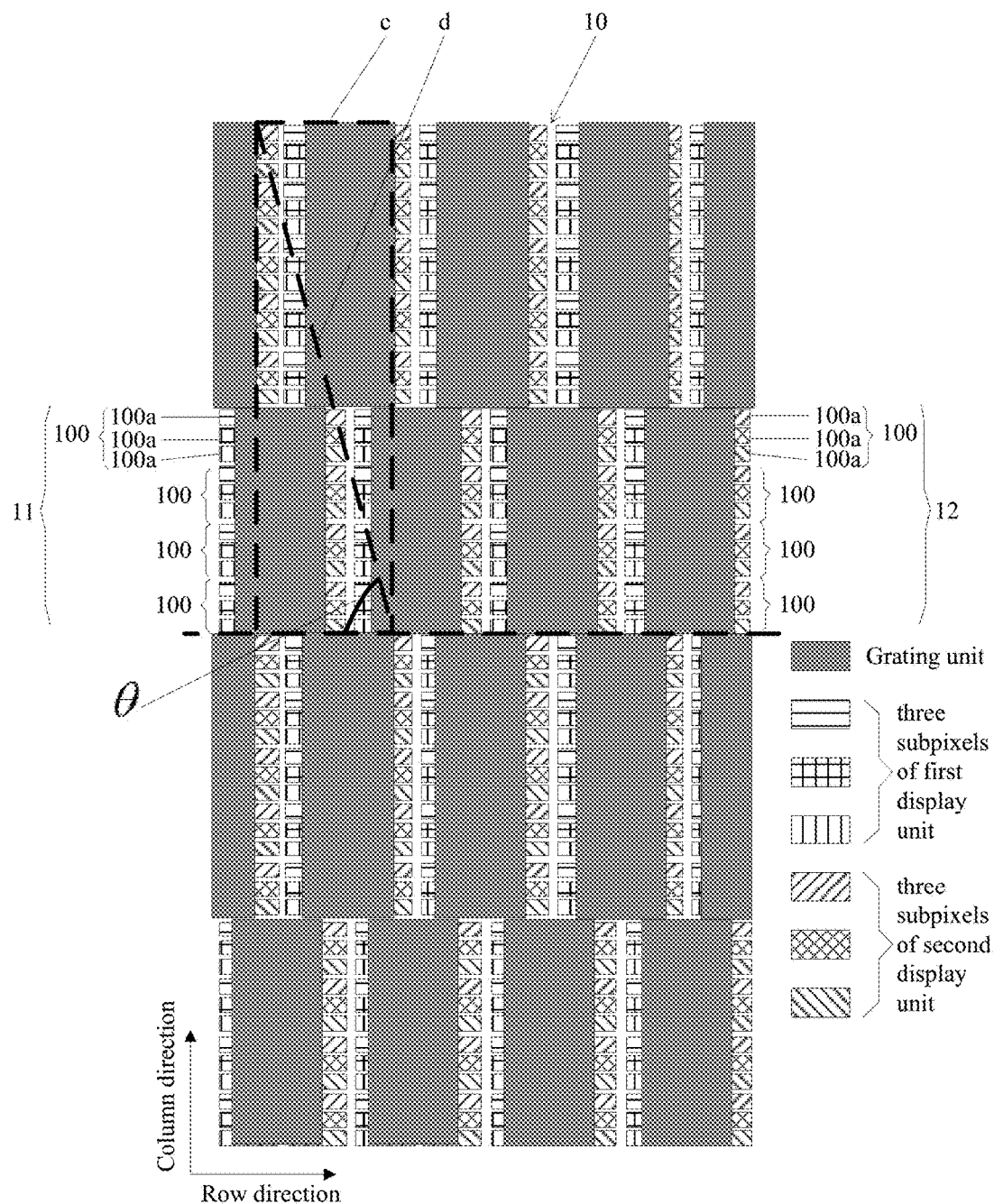
FIGS. 4a to 4d are schematic structural drawings showing relationship between pixels and grating units according to an embodiment of the disclosure.
Figure 4B:
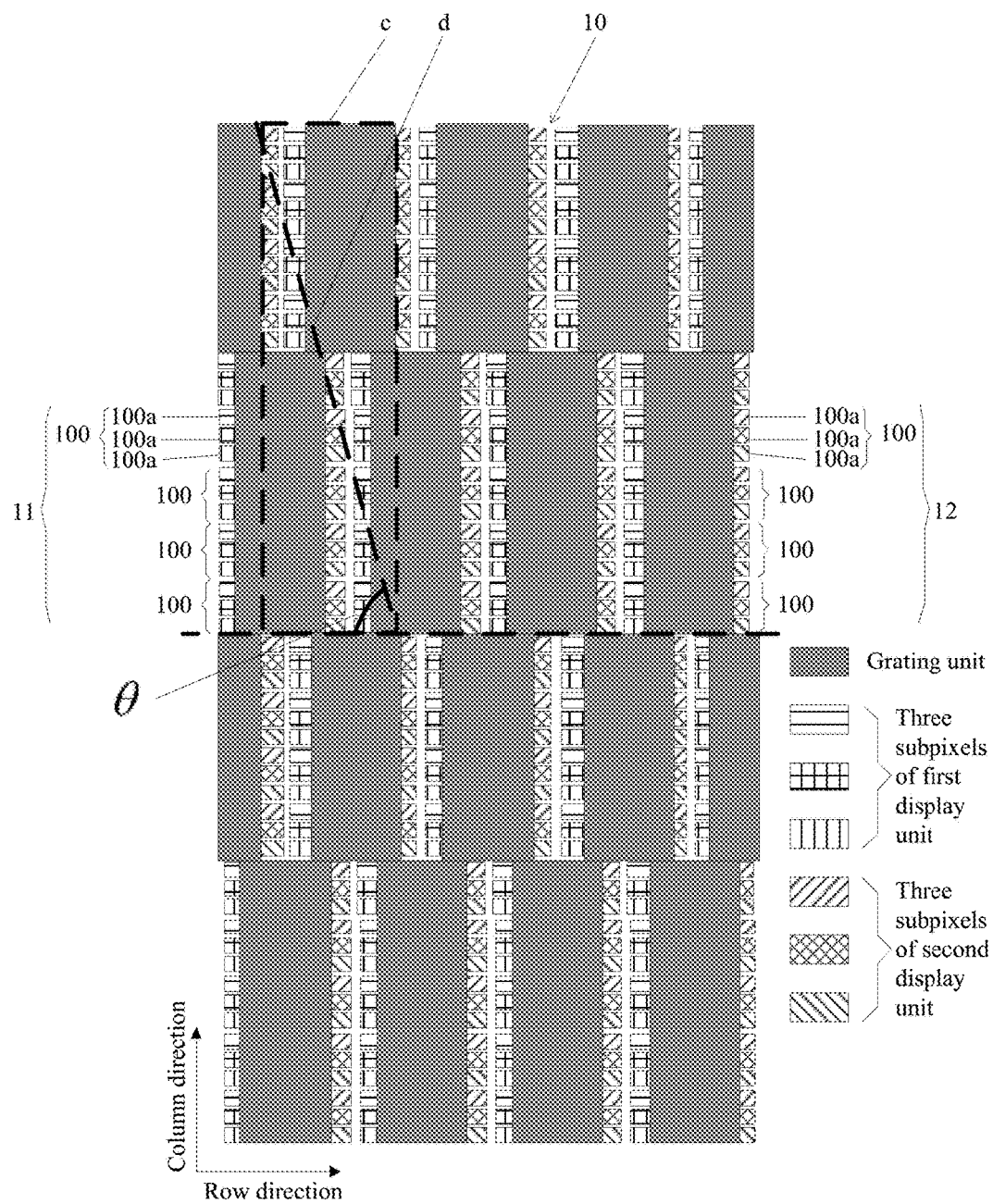

In an exemplary embodiment, as shown in FIGS. 4a and 4b, in any two adjacent rows of first and second display units 11, 12, each first display unit 11 and each second display unit 12 in one row may include five pixels arranged in the column direction of the two-dimensional display panel 10, while each first display unit 11 and each second display unit 12 in the other row may include four pixels arranged in the column direction of the two-dimensional display panel 10.

Figure 4C:
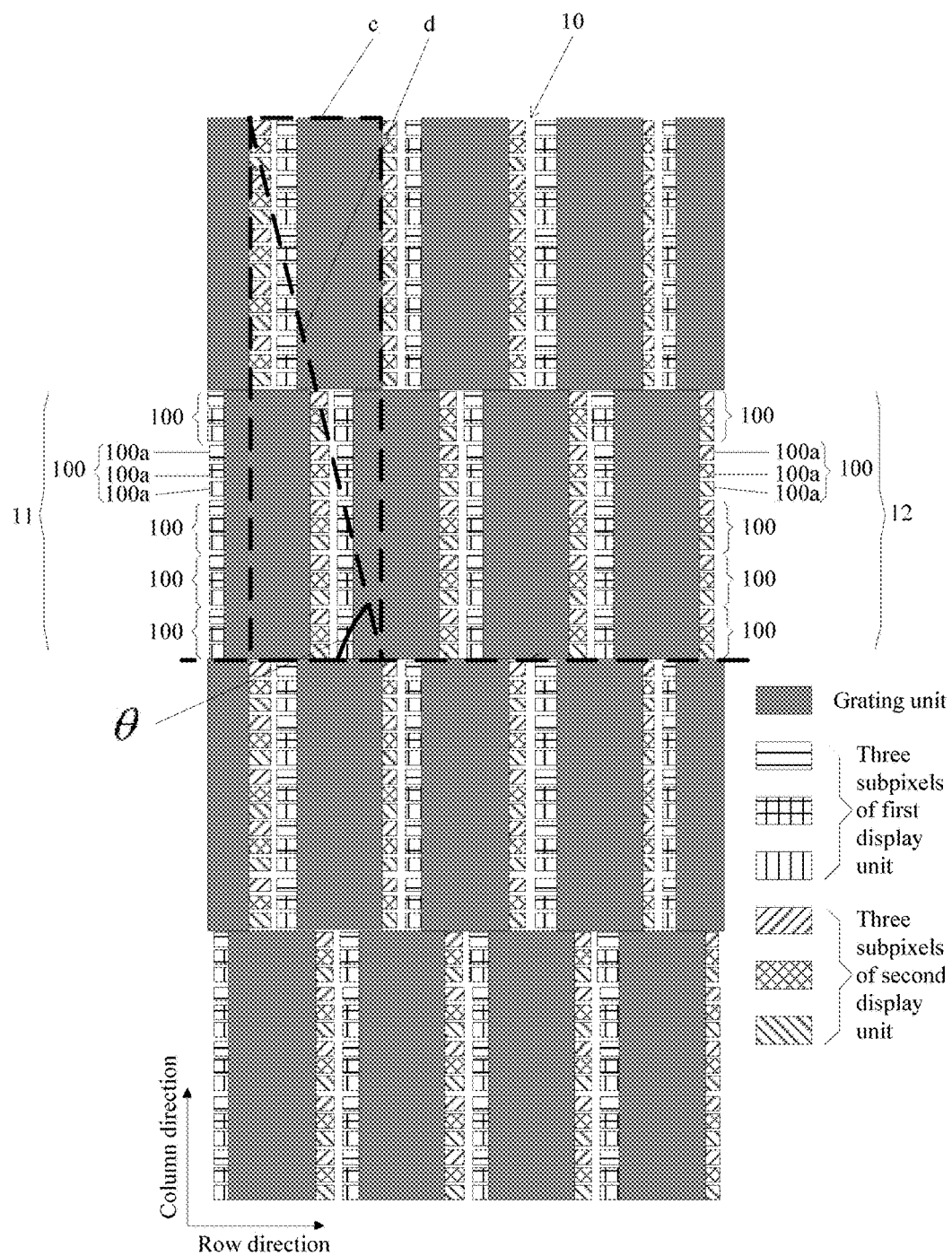

In another exemplary embodiment, as shown in FIG. 4c, each first display unit 11 and each second display unit 12 in each row may include five pixels arranged in the column direction of the two-dimensional display panel 10.

Figure 4D:
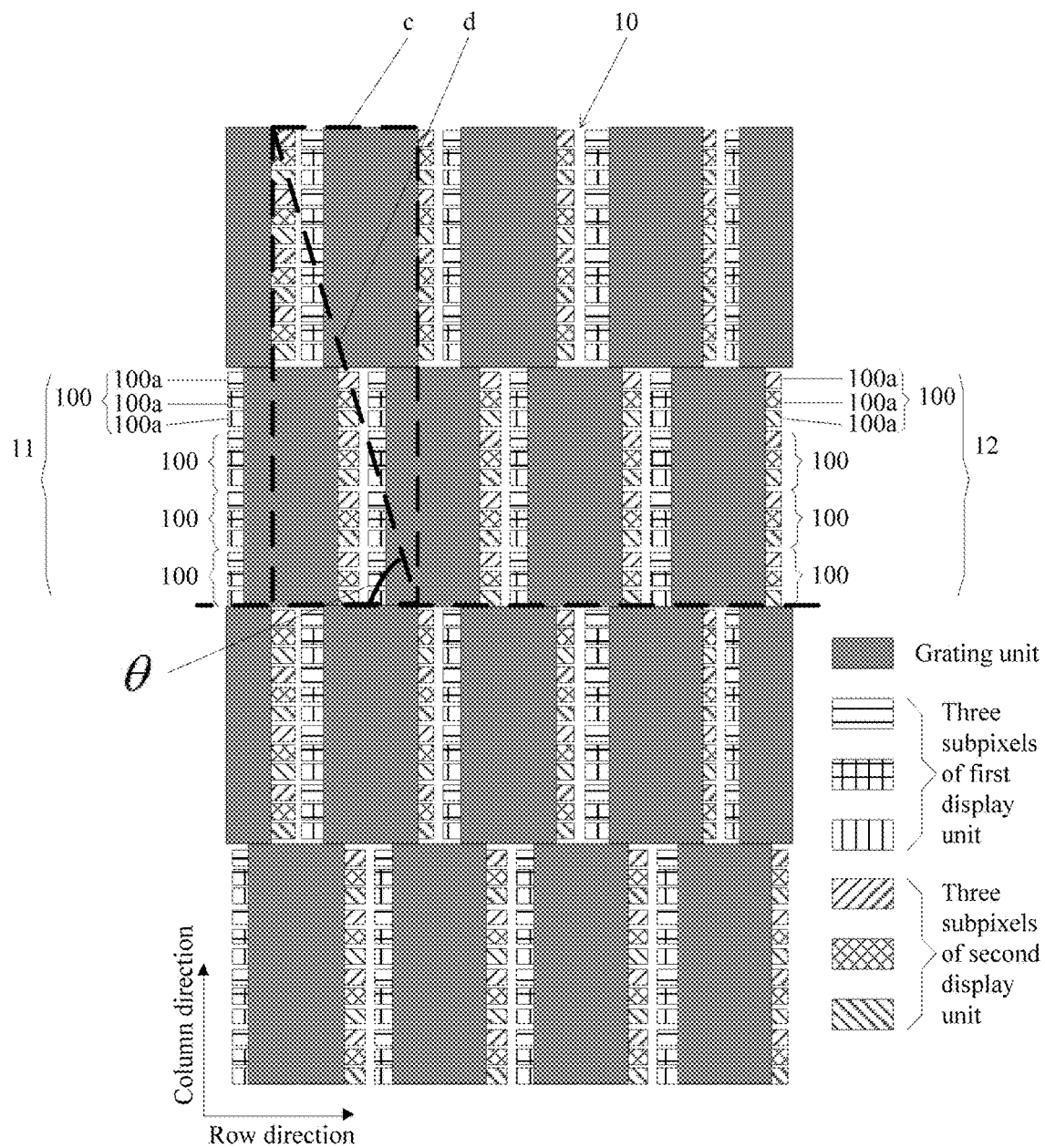

In a further exemplary embodiment, as shown in FIG. 4d, each first display unit 11 and each second display unit 12 in each row may include four pixels arranged in the column direction of the two-dimensional display panel 10.

Through calculations, it is proved that the configurations in embodiments shown in FIGS. 4a-4d may enable the inclined angle $\theta$ of the slit to satisfy the relations of $15.9° < \theta < 62.5°$ or $73.7° < \theta < 82.9°$.

In practice, after sizes of the two-dimensional display panel are determined, the width of the pixel may be determined, and then the pitch of the grating unit may be calculated in the following way based on the width of the pixel.

Figure 7A:
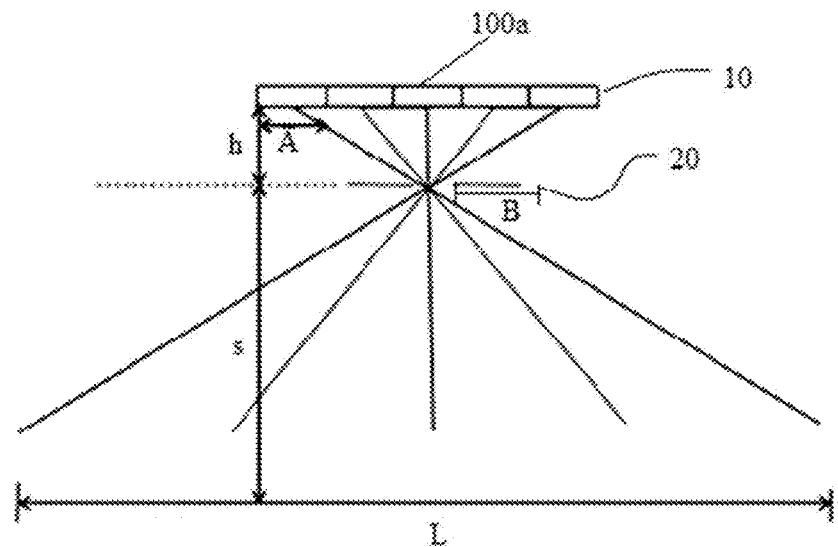
FIGS. 7a and 7b are schematic structural drawings showing a position relationship between a slit grating and a two-dimensional display panel according to an embodiment of the disclosure.

According to an exemplary embodiment of the disclosure, as shown in FIG. 7a, the slit grating 20 is disposed at a light exit side of the two-dimensional display panel 10, and a distance h between the slit grating 20 and the two-dimensional display panel 10 satisfies the following Equation (5):

$$h = a*s/L \qquad (5),$$

where A is a size of the sub-pixel 100a in the row direction of the two-dimensional display panel 10, s is a distance between the slit grating 20 and an observation point of the watcher's eye, and L is a distance between two eyes of the watcher.

After calculating the distance h between the slit grating 20 and the two-dimensional display panel 10 by using the Equation (5), the following Equation (6) is utilized to calculate the pitch B of two adjacent grating units 21 in the same row of the grating units 21:

$$B = 2*A*s/(s+h) \qquad (6),$$

where A is the size of the sub-pixel 100a in the row direction of the two-dimensional display panel 10, s is the distance between the slit grating 20 and the observation point of the watcher's eye, and h is the distance between the slit grating 20 and the two-dimensional display panel 10.

Figure 7B:
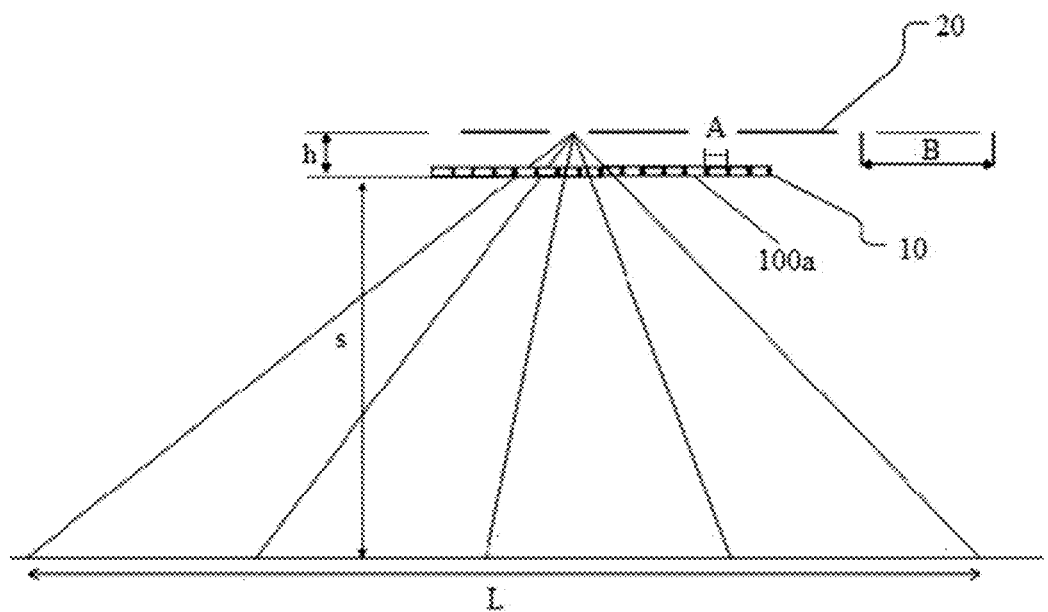

According to another exemplary embodiment of the disclosure, as shown in FIG. 7b, the slit grating 20 is disposed at a light incoming side of the two-dimensional display panel 10, and the distance h between the slit grating 20 and the two-dimensional display panel 10 satisfies the following Equation (7):

$$h = A*s/L - s \qquad (7),$$

where A is the size of the sub-pixel 100a in the row direction of the two-dimensional display panel 10, s is the distance between the slit grating 20 and the observation point of the watcher's eye, and L is the distance between two eyes of the watcher.

After calculating the distance h between the slit grating 20 and the two-dimensional display panel 10 by using the Equation (7), the following Equation (8) is utilized to calculate the pitch B of two adjacent grating units 21 in the same row of grating units 21:

$$B = 2*A*s/(s-h) \qquad (8),$$

where A is the size of the sub-pixel 100a in the row direction of the two-dimensional display panel 10, s is the distance between the slit grating 20 and the observation point of the watcher's eye, and h is the distance between the slit grating 20 and the two-dimensional display panel 10.

Although several exemplary embodiments have been shown and described in conjunction with the attached drawings, it would be appreciated by those skilled in the art that various changes or modifications may be made in these embodiments without departing from the principles and spirit of the disclosure, the scope of which is defined in the claims and their equivalents.

What is claimed is:

1. A three-dimensional display device, comprising a two-dimensional display panel and a slit grating disposed at a side of the two-dimensional display panel;

wherein the two-dimensional display panel comprises a plurality of first display units configured for displaying a left eye image and a plurality of second display units configured for displaying a right eye image, and the first display units and the second display units are alternately arranged in a row direction and a column direction of the two-dimensional display panel; and wherein the slit grating comprises a plurality of grating units arranged in a form of an array, a slit is formed between every two adjacent grating units in each row of grating units arranged in the row direction of the two-dimensional display panel, the slits and the grating units are alternately arranged in the column direction of the two-dimensional display panel, and the slit grating is configured to display the left eye image and the right eye image to observer's left eye and right eye respectively, wherein in any two adjacent rows of grating units, a central line of a most intermediate slit in one row of grating units is located in the same straight line as a central line of a most intermediate grating unit of the other row of grating units, and wherein the two-dimensional display panel further comprises a black matrix configured to space the first display units and the second display units apart, and a central line of the black matrix extending in the column direction of the two-dimensional display panel is located in the same straight line as the central line of the most intermediate slit in the one row of grating units of the any two adjacent rows of grating units.

2. The three-dimensional display device according to claim 1, wherein each first display unit comprises one or more pixels, each second display unit comprises one or more pixels, and the first display unit and the second display unit arranged in a same row in the row direction of the two-dimensional display panel comprise a same number of pixels.

3. The three-dimensional display device according to claim 2, wherein each pixel comprises sub-pixels of three different colors arranged in the column direction of the two-dimensional display panel, and a size of each sub-pixel in the column direction of the two-dimensional display panel is smaller than a size of the sub-pixel in the row direction of the two-dimensional display panel.

4. The three-dimensional display device according to claim 3, wherein a ratio between the size of the sub-pixel in the column direction of the two-dimensional display panel and the size of the sub-pixel in the row direction of the two-dimensional display panel is 1:3.

5. The three-dimensional display device according to claim 4, wherein an inclined angle θ of an equivalent inclined slit of an array formed by slits in two adjacent rows of grating units satisfies one of the following conditions:

$$15.9° < \theta < 62.5°, \text{ and}$$

$$73.7° < \theta < 82.9°,$$

wherein the inclined angle θ is defined as follows: in a rectangle having a long side equal to a sum of lengths of two adjacent rows of grating units in the column direction of the two-dimensional display panel and a short side equal to a sum of a distance between two adjacent grating units in the same row of grating units and the width of one grating unit, an included angle between a diagonal line of the rectangle and a straight line extending in the row direction of the two-dimensional display panel is defined as the inclined angle θ.

6. The three-dimensional display device according to claim 5, wherein within any two adjacent rows of display units, each of the first display unit and the second display unit in one row of the two adjacent rows comprises five pixels arranged in the column direction of the two-dimensional display panel, while each of the first display unit and the second display unit in the other row of the two adjacent rows comprises four pixels arranged in the column direction of the two-dimensional display panel.

7. The three-dimensional display device according to claim 5, wherein in each row of display units, each of the first display unit and the second display unit comprises five pixels arranged in the column direction of the two-dimensional display panel.

8. The three-dimensional display device according to claim 5, wherein in each row of display units, each of the first display unit and the second display unit comprises four pixels arranged in the column direction of the two-dimensional display panel.

9. The three-dimensional display device according to claim 3, wherein the slit grating is disposed at a light exit side of the two-dimensional display panel, and a distance h between the slit grating and the two-dimensional display panel satisfies the following equation:

$$h = A*s/L,$$

wherein A is a size of the sub-pixel in the row direction of the two-dimensional display panel, s is a distance between the slit grating and an observation point of an observer's eye, and L is a distance between two eyes of the observer.

10. The three-dimensional display device according to claim 9, wherein a pitch B between two adjacent grating units in the same row of grating units satisfies the following equation:

$$B = 2*A*s/(s+h),$$

wherein A is the size of the sub-pixel in the row direction of the two-dimensional display panel, s is the distance between the slit grating and the observation point of the observer's eye, and h is the distance between the slit grating and the two-dimensional display panel.

11. The three-dimensional display device according to claim 3, wherein the slit grating is disposed at a light incoming side of the two-dimensional display panel, and a distance h between the slit grating and the two-dimensional display panel satisfies the following equation:

$$h = A*s/L - s,$$

wherein A is a size of the sub-pixel in the row direction of the two-dimensional display panel, s is a distance between the slit grating and an observation point of an observer's eye, and L is a distance between two eyes of the observer.

12. The three-dimensional display device according to claim 11, wherein a pitch B between two adjacent grating units in the same row of grating units satisfies the following equation:

$$B = 2*A*s/(s-h),$$

wherein A is the size of the sub-pixel in the row direction of the two-dimensional display panel, s is the distance between the slit grating and the observation point of the observer's eye, and h is the distance between the slit grating and the two-dimensional display panel.

* * * * *